United States Patent [19]

Gfeller et al.

[11] Patent Number: 4,949,112
[45] Date of Patent: Aug. 14, 1990

[54] SHEET FILM CASSETTE FOR PHOTOGRAPHIC CAMERAS

[75] Inventors: Karl Gfeller, Langwiesen; Kurt Gloor, Thayngen, both of Switzerland

[73] Assignee: Sinar AG Schaffhausen, Switzerland

[21] Appl. No.: 400,383

[22] Filed: Aug. 30, 1989

[30] Foreign Application Priority Data

Sep. 30, 1988 [CH] Switzerland .................. 3638/88

[51] Int. Cl.⁵ ............................................. G03B 17/26
[52] U.S. Cl. .................................... 354/284; 354/283; 354/276
[58] Field of Search ..................... 354/275, 276–285

[56] References Cited

U.S. PATENT DOCUMENTS 4,493,545 1/1985 Bauer et al. ..................... 354/284

Primary Examiner—Michael L. Gellner
Assistant Examiner—Khanh Dang
Attorney, Agent, or Firm—Watson, Cole, Grindle & Watson

[57] ABSTRACT

A sheet film cassette is provided with a flat housing 10 having a picture defining gate 14 on the front and a swingable rear wall 11 on the rear of the cassette. When the rear wall 11 is open, the cassette can be loaded from its rear. The rear wall 11 has a pressure device 20–22 located on its inner side to elastically force a sheet film loaded onto the cassette against supporting shoulders 18 located along the periphery of the picture defining gate 14 and lying in a common plane. The pressure device 20–22 has a flat pressure plate 20 and a bridge-like leader element 22 arranged between the pressure plate 20 and the rear wall 11. The leader element 22 has pairs of opposing support runners 23 that extend over the opposing peripheral edge of the pressure plate 20 and have stop faces 26 for interacting with the outermost peripheral edges of the loaded sheet film F. When the rear wall 11 is closed, the mechanical stress that holds the film snugly to the pressure plate 20 is imparted to the loaded sheet film F by means of the stop faces 26 of the support runners 23. This guarantees that the part of the sheet film F to be exposed will be completely flat.

7 Claims, 2 Drawing Sheets

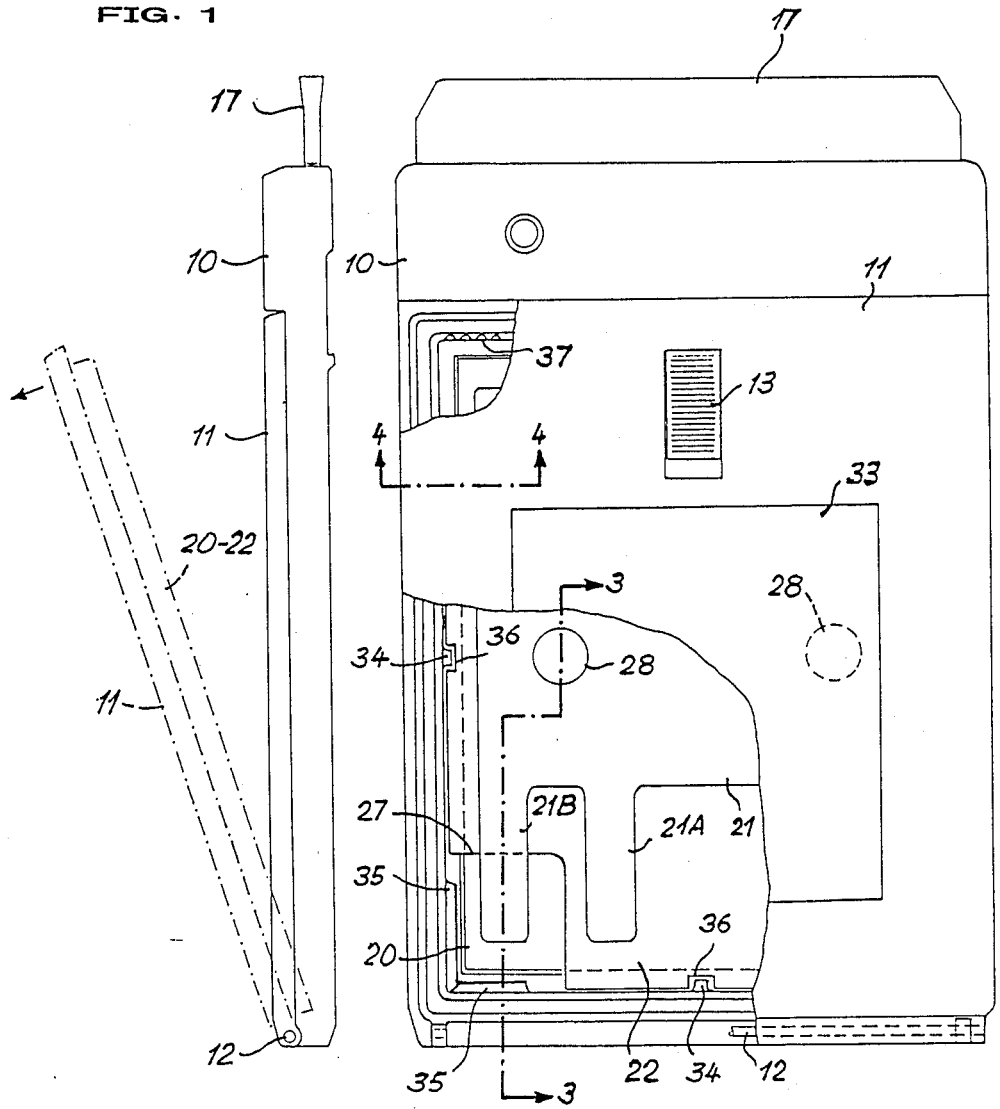

SHEET FILM CASSETTE FOR PHOTOGRAPHIC CAMERAS

BACKGROUND OF THE INVENTION

1. Field of the Invention

The present invention relates generally to sheet film cassettes for photographic cameras and more particularly to such a cassette which ensures proper loading of a sheet film.

2. Discussion of the Related Art

A standard sheet film cassette is described in West German patent No. 827,749. The described cassette can be loaded and unloaded conveniently from the rear of the cassette when the rear wall is open. In addition, the position of a loaded sheet film is determined by supporting shoulders located on the periphery of the picture defining gate so that in theory the light-sensitive layer of the sheet film is always in the same plane independent of the thickness of the carrier material. This film plane is nearly parallel with the ground-glass plane of the camera. Despite these theoretical advantages, practical application of the described sheet film cassette has proven that the loaded sheet film is frequently not completely parallel but rather is arched away from the pressure plate against the front side of the cassette between the opposing supporting shoulders. Such arching impairs optimal sharpness of the photograph.

Accordingly, it is an object of the present invention to improve the sharpness of photographs while providing convenient loading and unloading of the film.

It is a further object of the present invention to design a sheet film cassette of the aforementioned kind such that the loaded sheet film is always forced to lie snugly against the pressure plate, thereby guaranteeing that the light-sensitive layer of sheet film to be exposed lies almost entirely flat in the plane defined by the supporting shoulders.

Another object of the present invention to obtain the foregoing objects regardless of the thickness of the carrier material.

Other objects and advantages are apparent in the drawings and description which follow.

SUMMARY OF THE INVENTION

The foregoing and additional objects are obtained by the sheet film cassette according to the present invention.

A sheet film cassette for photographic cameras is provided which includes a flat housing having an interior for receiving an inserted light sensitive film, a front side having a picture defining gate, and a rear side. A rear wall located in the rear side and is movably connected to the housing to allow the film to be inserted or removed from the housing interior. Supporting shoulders are located along a periphery of the picture defining gate and project towards the rear side. A pressure plate resiliently contacts an inner side of the rear wall via a resilient member inserted between the pressure plate and this inner side. Guide grooves are located in the housing interior near the front side of the housing. A slide is provided in sliding contact with the guide grooves and is slidable from a closed position which sealingly closes the picture defining gate to an open position which completely opens the gate. A bridge-like leader element is arranged between the pressure plate and the rear wall. A pair of support runners are located on the leader element and are received in the groove-like depressions. The support runners extend over opposing peripheral edges of the pressure plate and each support runner has a side facing the front side of the housing having a dimension perpendicular to the front side which is greater than a dimension of the pressure plate perpendicular to the front side. Stop faces are located on the support runners and are sloped to contact outermost peripheral edges of the inserted film and thereby impart a stress to a middle portion of the inserted film when the rear wall is closed. Accordingly, the middle portion of the inserted film is snugly secured against the pressure plate. Thus, the layer of sheet film to be exposed lies flat.

The invention is explained in detail with reference to the preferred embodiments and to the attached drawings in the following description.

BRIEF DESCRIPTION OF THE DRAWINGS

FIG. 1 is a side view of a sheet film cassette of the invention with a pivotable rear wall, which can be swung into an open position for inserting and removing the sheet film;

FIG. 2 is a rear view of the cassette, wherein the rear wall is partially broken away in order to show the internal parts of the cassette;

DETAILED DESCRIPTION OF THE PREFERRED EMBODIMENTS

The sheet film cassette according to the present invention has a flat housing with a frame-like housing section 10 and a rear wall 11, which can be pivoted at the frame-like housing section 10 by means of a hinge 12. In order to position the rear wall 11 in a closed position, a lock bolt, preferably spring-loaded, with an actuating knob 13 is mounted on rear wall 11. After detaching the lock bolt by means of the actuating knob 13, the rear wall 11 can be pivoted by at least 180° away from the housing section 10 into an open position, as indicated by the dash-dotted lines in FIG. 1. When the rear wall 11 is open, the interior of the cassette is freely accessible via the rear opening so that a sheet film can be inserted or removed with ease. In its closed position, the rear wall forms a light-tight closure for the housing section 10 when circular ribs 10A and 11A (FIGS. 3-5), respectively mounted on the housing section 10 and on the rear wall 11, mesh alternatingly.

Figure 3:
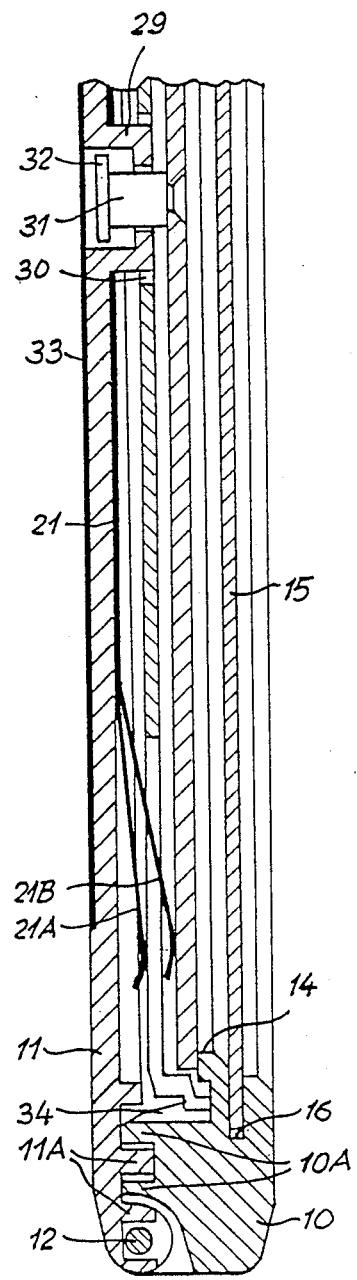
FIG. 3 is a longitudinal view of a part of the sheet film cassette along the line 3—3 of FIG. 2 on an enlarged scale.
Figure 4:
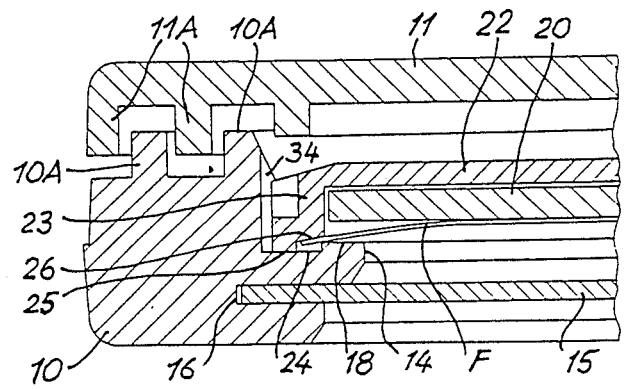
FIG. 4 is a cross-sectional view of a part of the sheet film cassette along the line 4—4 of FIG. 2, with a loaded sheet film with the rear wall not completely closed, on an even larger scale.
Figure 5:
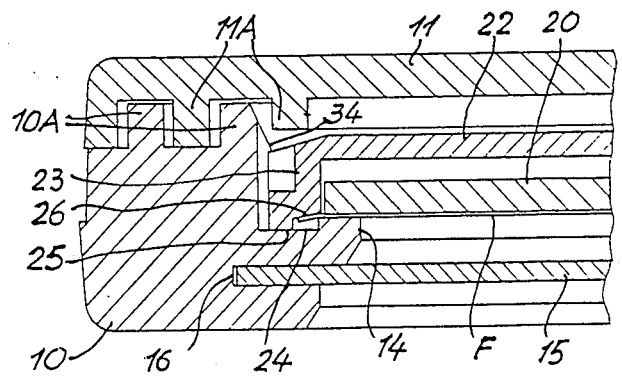
FIG. 5 is a sectional view of a part of the sheet film cassette, analogous to that of FIG. 4, with the rear wall completely closed.

A picture defining gate 14 is located on the front side of the frame-like housing section 10. This gate 14 defines the format of a part to be exposed of the light-sensitive layer of an inserted sheet film. As seen in FIGS. 3-5, the picture defining gate 14 can be closed light-tight in a conventional manner by actuating a handle 17 to cause a light-tight slide 15 to slide in guide grooves 16 located in the housing interior near the front side (FIGS. 1 and 2). When the sheet film cassette is attached to a camera, the light-tight slide 15 can be moved by means of the handle 17 into an open position that completely opens the picture defining gate 14 (not illustrated) in order to photograph an object. Supporting shoulder contact surfaces 18, which lie in a common plane and support the peripheral parts of a sheet film F loaded into the cassette, are located along the periphery of the picture defining gate 14. Mounted on the rear wall 11 is a pressure device 20-22, which serves to force the inserted sheet film F against supporting shoulders 18.

A conventional planar pressure plate 20 is provided on an inner side of rear wall 11 and is under the influence of a leaf spring 21 inserted between this inner side and the plate (FIGS. 2 and 3). Pressure device 20-22 also has a bridge-like leader element 22 arranged between the pressure plate 20 and the rear wall 11. Leader element 22 is also under the influence of the leaf spring 21. At the periphery of the leader element 22 are pairs of opposing support runners 23, which extend with clearance over the opposing peripheral edge of the pressure plate 20, as shown in FIGS. 4 and 5. Each support runner 23 has a depth in a direction perpendicular to the front of the housing section 10 which extends beyond the width of the pressure plate 20 in the same direction so that the pressure plate 20 can move relative to runners 23 towards the front or rear of the cassette within the space defined by the support runners 23.

Figure 6:
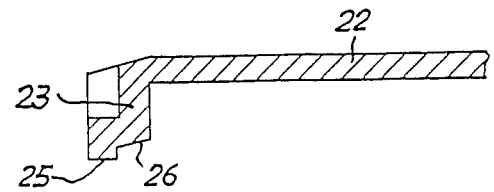
FIG. 6 shows a detail of FIGS. 4 and 5.

Each supporting shoulder 18 has a groove-like depression 24 extending towards the front of the housing section 10 which receives one of the support runners 23 of the leader element 22. Referring to FIGS. 4-6, each support runner 23 has an end face 25 which lies against the bottom of the respective depression 24 and one stop face 26 which is set back opposite the end face 25 and tilted with respect to the plane defined by the supporting shoulder 18. The tilt of stop face 26 diverges towards the front of the housing section 10. With respect to the plane defined by the supporting shoulders 18, the stop faces 26 may be tilted at an angle ranging from 3° to 15°, and preferably at an angle from 5° to 10°. The purpose of the tilted stop faces 26 of the opposing support runners 23 is to interact with the outermost peripheral parts of an inserted sheet film F which project over the depressions 24, as explained in detail below.

The aforementioned leaf spring 21 is arranged between the rear wall 11 and the bridge-like leader element 22 and has several finger-shaped extensions 21A and 21B (FIGS. 2 and 3) which interact in part with the leader element 22 and in part with the pressure plate 20 in order to force these components in a direction away from the rear wall 11. As seen in FIG. 2, the leader element 22 has recesses 27 located at its corners. These recesses 27 provide a passage for each of the finger-like extensions 21B to the pressure plate 20. The finger-like extensions 21A and 21B of the leaf spring 21 are shaped in such a manner that upon closing of the rear wall 11, the support runners 23 of the bridge-like leader element 22 are first forced into the depressions 24 of supporting shoulders 18 and then the pressure plate 20 is forced against supporting shoulders 18.

The leaf spring 21 has round break-through 28 (FIG. 2) through which hollow cylindrical guide projections 29 (FIG. 3) project. The bridge-like element 22 is also provided with round break-through 30 (FIG. 3) through which each of the guide projections 29 project with clearance. Two pins 31 (only one is shown in FIG. 3) are fastened to the rear side of pressure plate 20, i.e., the side facing rear wall 11. Each of these pins 31 can be moved axially in one of the hollow cylindrical guide projections 29 and has on its free end a widened head 32 which prevents the pin 31 from sliding out of the guide projection 29. The whole pressure device 20-22 is connected to the rear wall 11 by means of the described guide projections 29 and pins 31 in such a manner that when rear wall 11 is opened, the pressure device 20-22 is moved out of the interior of the housing section 10, thus allowing a sheet film F to be inserted into or removed from the cassette. A cover 33 is attached to the outside of the rear wall 11 and covers the apertures of the hollow cylindrical guide projections 29.

To position the sheet film F correctly with respect to the picture defining gate 14, the peripheral walls of the interior of the housing section 10 are provided with several guide ramps 34 and 35 which form tilted guide surfaces These ramps diverge towards the rear of the housing section 10 for guiding the peripheral edges of the inserted sheet film F. One part of these guide ramps has the shape of ribs 34, which extend into corresponding peripheral notches 36 of the bridge-like leader element 22, as shown in FIG. 2.

Indentations 37 are provided along a part of a peripheral wall of the interior of the housing section 10. These indentations 37 can be felt in the dark by a person loading the cassette with a sheet film F. The position of the indentations agrees with the standardized position of marking notches on the edge of a standardized sheet film that has been correctly loaded into the cassette.

To load the described cassette with a sheet film, the rear wall 11 is opened and swung away from the housing section 10 by about 180°. The pressure device 20-22 mounted on the rear wall 11 exits the interior of the housing section 10 and thus clears a path for loading the sheet film. The sheet film F is loaded from the rear of the housing section 10 into the housing interior with the light-tight slide 15 closed and in complete darkness, such that the marking notches on the edge of the sheet film are aligned with the indentations 37 at the aperture of the interior of the housing section 10. Next, the light-sensitive layer of the loaded sheet film is turned towards the picture defining gate 14 and the light-tight slide 15. The guide ramps 34 and 35 on the peripheral walls of the interior of the housing section 10 guide the sheet film during loading automatically into the correct position with respect to the picture defining gate 14 such that all peripheral parts of the sheet film extend over the supporting shoulders 18.

Subsequently, the rear wall 11 is swung back into its closed position in order to close the housing light-tight. At this time the pressure device 20-22 automatically enters the interior of the housing section 10. Just before the rear wall 11 reaches its closed position, the bridge-like leader element 22 is forced by leaf spring 21, and in particular by its finger-like extensions 21A, in the direction of the front of the cassette until the end face 25 of each support runner 23 sits on the bottom of the groove-like depression 24 of contact surfaces 18. At the same time the tilted stop face 26 of each support runner 23 touches the respective peripheral part of the inserted sheet film F, as shown in FIG. 4. The outermost peripheral parts of the sheet film F are forced by means of the tilted stop faces 26 over the plane defined by the contact surfaces 18 in the direction of the front side of the cassette such that the sheet film is arched in the opposite direction against the pressure plate 20. In this manner the sheet film F does not experience any jamming between the stop face 26 and the supporting shoulders 18 during the closing phase (FIG. 4) or in the closed state (FIG. 5).

When rear wall 11 is completely closed, the finger-like extensions 21B of the leaf spring 21 also force the pressure plate 20 in the direction of the picture defining gate 14, i.e., towards the front side of the housing. Accordingly, the peripheral parts of the sheet film F are clamped between supporting shoulders 18 and the pressure plate 20 and the entire part of the sheet film behind the picture defining gate 14 are forced into a completely planar position, as shown in FIG. 5. Since the outermost peripheral parts of the sheet film F that are touched by the tilted stop faces 26 continue to be forced against the front of the cassette over the plane defined by the contact surfaces 18, the sheet film F experiences an internal mechanical stress which holds its middle section snugly against the pressure plate 20. This guarantees that the sheet film never arches away from the pressure plate 20 and consequently that part of the sheet film to be exposed when taking pictures remains completely flat.

The described loaded cassette is used in the conventional manner in a photographic camera and accordingly has not been described in detail. To remove the sheet film from the cassette, the rear wall 11 is swung again into its open position so that the sheet film can be removed with ease from the rear of the housing section 10.

Of course, the described cassette can have other conventional logical devices, such as a lock against unintentional double exposure of the loaded sheet film and indicators to signal whether the cassette is empty or loaded and/or whether the light-tight slide for exposing the loaded sheet film is in an opened or closed position.

What is claimed is:

1. A sheet film cassette for receiving a light sensitive film for use in photographic cameras, the sheet film cassette comprising:

a flat housing having an interior for receiving the inserted film, a front side having a picture defining gate, and a rear side;

a rear wall located in said rear side, said rear wall movably connected to said housing between an open position to allow insertion and removal of the film and a closed position;

supporting shoulders located along a periphery of the picture defining gate and projecting towards the rear side;

a pressure plate resiliently communicating with an inner side of said rear wall via a first resilient member;

guide grooves located in the housing interior near the front side of said housing;

a slide in sliding contact with said guide grooves, said slide slidable from a closed position which sealingly closes the picture defining gate and an open position which completely opens the gate;

a bridge-like leader element arranged between said pressure plate and the inner side of said rear wall, said leader element resiliently communicating with the inner side via a second resilient member;

a pair of support runners located on said leader element, received in said groove-like depressions, and extending over opposing peripheral edges of the pressure plate when said rear wall is partially closed, each support runner having a side facing the front side of said housing which has a dimension perpendicular to the front side which is greater than a dimension of the pressure plate perpendicular to the front side, whereby a space is defined to allow said pressure plate to move relative to said support runners towards the housing front when said rear wall is being closed; and stop faces located on said support runners, said stop faces being sloped to contact outermost peripheral edges of the inserted film when said rear wall is partially closed, said stop faces thereby imparting a stress to a middle portion of the inserted film, whereby a middle portion of the inserted film is secured snugly against said pressure plate.

2. The cassette according to claim 1, wherein each support runner of said bridge-like leader element has an end face which abuts the bottom of said depression in the supporting shoulder and wherein said stop face of each support runner is set back opposite the end face to force an outermost peripheral part of a loaded sheet film that extends into the region of the depression beyond a plane defined by the supporting shoulders in the housing front when said rear wall is being closed.

3. The cassette according to claim 2, wherein the stop faces of the opposing support runners tilt with respect to a plane defined by said supporting shoulders towards the front side of said housing.

4. The cassette according to claim 3, wherein the tilt of the stop faces of the support runners ranges from 3° to 15° with respect to the plane defined by said supporting shoulders.

5. The cassette according to claim 1, wherein the tilt of the stop faces ranges from 5° to 10° with respect to the plane defined by said supporting shoulders.

6. The cassette according to claim 1, wherein peripheral walls of the interior of said housing are provided with several guide ramps with tilted guide surfaces, said guide ramps diverging towards said rear wall interior for guiding peripheral edges of the sheet film to be inserted in the interior.

7. The cassette according to claim 6, wherein one of the peripheral walls of the interior has a part provided with indentations, said indentations located to correspond with notches positioned on the peripheral edges of the inserted film.

* * * * *